Figure 1:
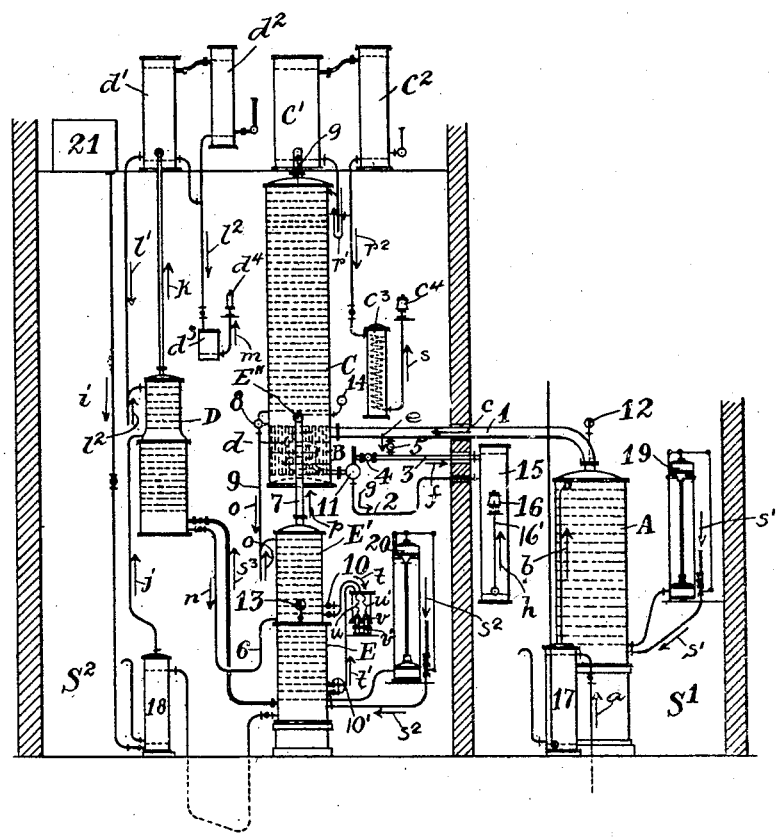

E. GUILLAUME.
PROCESS OF HEATING COLUMN STILLS.
APPLICATION FILED MAY 24, 1910.

1,199,371.

Patented Sept. 26, 1916.
2 SHEETS—SHEET 1.

WITNESSES:
David J. Walsh
F. H. Logan

INVENTOR
Emile Guillaume
BY
ATTORNEY

UNITED STATES PATENT OFFICE.

EMILE GUILLAUME, OF PARIS, FRANCE.

PROCESS OF HEATING COLUMN-STILLS.

1,199,371.  Specification of Letters Patent.  Patented Sept. 26, 1916.

Application filed May 24, 1910. Serial No. 563,105.

*To all whom it may concern:*

Be it known that I, EMILE GUILLAUME, citizen of the French Republic, residing at Paris, France, have invented a new and useful Improvement in Processes of Heating Column-Stills; and I do hereby declare the following to be a full, clear, and exact description of the same.

This invention relates to processes of heating column stills; and it comprises a method of heating column stills wherein adjusted amounts of the total alcoholic vapors produced in one still are condensed in the heating elements of another under regulated pressure; all as more fully hereinafter set forth and as claimed.

The subject matter of the present invention is certain improvements made in the heating of a rectifying or secondary column still in apparatus for distillation and rectification, whether such apparatus be adapted for distillation and rectification in a direct and continuous manner, or whether continuous separate rectification is utilized. These improvements, which are a development of certain improvements disclosed in my prior Patent No. 887,793 of May 19, 1908, are in part applicable in distillation organizations and methods such as are disclosed in said patent and are also particularly applicable in other apparatus for continuous rectification and distillation, or continuous rectification alone, where the system embraces a purifying column for phlegms of low strength.

In the case of continuous separate rectification in the distillery, that is where the distilling and rectification though effected in the same plant are separate operations, in the present invention the vapors of distillation are caused to pass through a heating element which, for the present purposes, is also a condenser, arranged in heating relationship to a rectifying column still. With this arrangement, the heating element is, as stated, a condenser and takes the place of the condenser usually employed with the primary still, thereby enabling the saving and utilization of much of the heat ordinarily wasted in such condenser. At the same time the arrangement gives a desirable type of heating of the secondary or rectifying still.

It is to be noted that in the present invention where the wine, etc., forming the raw material is to be preliminarily heated this instead of being done by a heat interchanger abstracting heat from the still products, must be done by a special heating arrangement, as by placing a "wort warmer" at the head of the rectifying column, since the usual heat-interchanger at the head of the primary still is necessarily done away with.

In the case of direct and continuous distilling and rectifying systems embracing a primary or wine still, a purifying column for low degree phlegms, a continuously operating rectifying still and a column for the exhaustion of the wash, in the present invention the vapors coming from the primary pass through special connections to and from the heating elements of the rectifying column before going to the low degree purifying column, which must be suitably located in the system.

The distilling and rectifying operations may be conducted much as usual, as regards the special operative methods, and as if completely separated, but the heat of the vapors from the primary still is utilized in lieu of being sent to waste. Rectified alcohol may be obtained of the same character as that produced by separate operation of the two classes of stills.

In the accompanying illustration I have shown more or less diagrammatically certain typical embodiments of apparatus elements of the many embodiments adapted for employment in the stated process.

Figure 2:
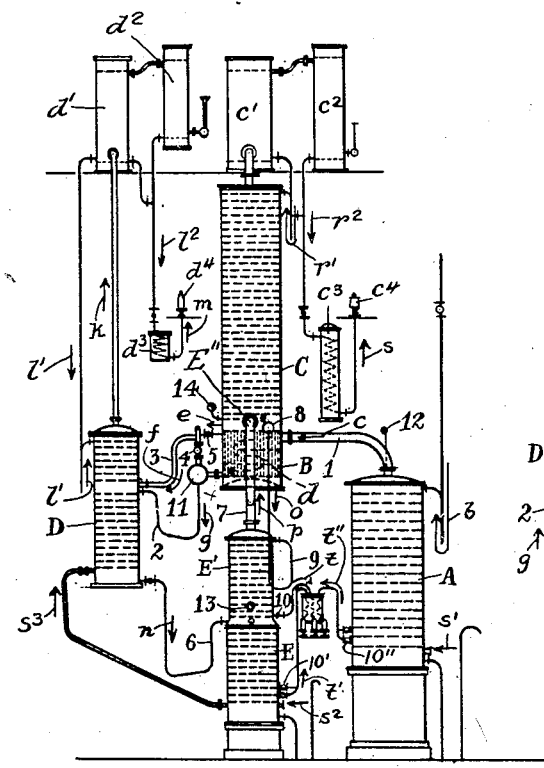
Figure 3:
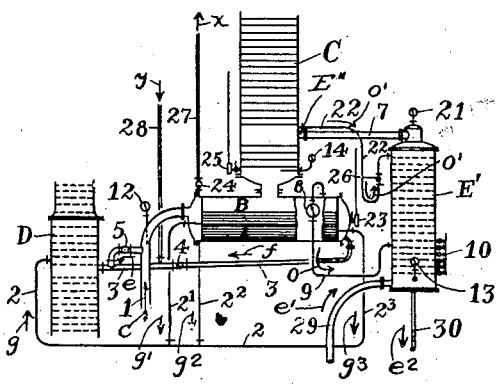

In this showing, Figure 1 is a view, mainly in elevation, of an embodiment wherein distillation and rectification are separate operations; Fig. 2 is a similar view of an apparatus for direct and continuous distillation and rectification; and Fig. 3 is a detail view of a modification of the arrangement of the heater-condenser and connections.

In Fig. 1, element A is a primary still, which may be, as shown, in a separate room S'. Vapors pass through vapor line 1 through a partition wall to a rectifying plant in room S² and enter a heater B of an ordinary tubular type in the base of rectifying column C. From the base of B, lead a trapped pipe 2 and a pipe 3, respectively carrying condensate and vapor. The latter pipe is valved at 4 and has a valved by-pass 5 connecting it with the vapor line 1. By suitable manipulation of valves 4 and 5, the amount and pressure of the vapors passing into B can be controlled. Pipe 2, in this figure, provides continuous removal of condensed liquid without disturbance of these adjustments. From a purifier column D, of an ordinary type, inflow pipe 6 leads to and supplies a wash-exhausting column E, having an upper section E' above the inflow pipe. Vapor lead 7 returns the alcoholic vapors from the column E—E to rectifying column C at a point E'' above E. Valved outlet 8, continued as pipe 9, returns liquid to the exhausting column section E'. This upper section, E' of column E may be omitted but is desirable since otherwise the return liquid flow would necessarily be into the top of the exhausting column proper. Elements 10—10' designate as a whole connections for removing fusel oil and collecting the same by means of pipes $t$, $t'$ and coolers $u$, $u'$ in testing devices $v$, $v'$. Element 11 is a flask or separator for separating the vapors and liquid emerging from B. Elements 12, 13 and 14 are heat-indicating devices, such as thermometers or thalpotassimeters, which allow regulation of the operation. The vapor and liquid from B pass, in this embodiment of the invention, into the condenser or cooler 15, provided with testing device 16, for the raw phlegms. Element 17 is a preheater for the wine or other liquid to be distilled in the primary still A; and may be of any ordinary type; 18 is a heat-economizer or preheater for the raw phlegms fed to purifying column D; 19 and 20 are steam regulators controlling, respectively, the heating of the primary still A and of the exhausting column E; the steam flowing by regulator 19 in the path indicated by arrows $s^1$—$s^1$ and by 20 as indicated by arrows $s^2$—$s^2$. Element 21 is a phlegm vat for receiving the condensed phlegms of the primary still.

In the operation of the described apparatus, the raw wine or other alcoholic liquid passes through preheater 17 into A (as indicated by arrows $a$ and $b$) where it is distilled in the ordinary manner, the enriched alcoholic vapors passing through 1 into B (arrow $c$) where they are in part condensed, following the direction of arrow $d$. By the aid of valve 4 the pressure, and consequently the heat, may be controlled in the heating element of rectifying column C. Valved by-pass 5 allows the shunting of any desired fractional amount of vapors from 1 into vapor pipe 3 (arrow $e$) without going through B so that the amount of heat delivered to B can be thus controlled. Valve 4 and by-pass 5 allow a delicate regulation, such as is necessary in a rectifying column, of the heat delivered to C. The heating power of the vapors coming from the primary still A is of course a function of their alcoholic richness, a rich vapor being at a lower temperature than a poorer vapor. Such a portion of the vapors from the primary still A as is not necessary or desirable in heating the rectifying column C is simply shunted or by-passed through 5 and goes to the condenser 15, (arrow $f$) thereby allowing regulation of heating without embarrassing the operation of the primary still A.

It is in all cases desirable in running a rectifying column that an ample amount of heat be supplied but that this amount be controlled and regulable. Too much heat produces obstruction of the plates of the column.

The liquid phlegms from 15 may be delivered to the vat 21 and thence through 18 (arrows $i$ and $j$) to purifying column D which is provided with the usual condensers and accessory parts, $d^1$, $d^2$, $d^3$, $d^4$. Arrow $k$ shows the course of vapors from D to $d^1$; arrows $l^1$ and $l^2$ show the course of condensate coming from $d^1$ and $d^2$ and arrow $m$ shows the course of condensate from cooler $d^3$ to testing $d^4$. Purified phlegms pass from the purifying column D to the exhausting column E. The material passes through pipe 6 as shown by arrow $n$. To E is also supplied wash from rectifying column C through 9 (arrow $o$) and the alcoholic vapors pass into E' through 7 (arrow $p$). Column C is also provided with the usual condensers and accessory parts, these parts being marked $c^1$, $c^2$, $c^3$ and $c^4$. Arrow $q$ shows the course of vapor going from C to $c^1$ and arrows $r^1$ and $r^2$ show the course of condensate returning from $c^1$ and $c^2$. Arrow $s$ shows the course of condensate going through cooler $c^3$ and tester $c^4$.

In the modification shown in Fig. 2 distillation and rectification are continuous operations without break of continuity as in the system of Fig. 1. Like elements of the two figures are designated by like reference characters. In this modification, the phlegm cooler (15) is omitted and the described outlets from B deliver vapor and liquid into purifying column D. The same by-pass and valves exist, by-pass 5 establishing the shunt communication with the vapor from vapor line 1 which can pass therethrough to D without having to pass from above downward through the tubular heating element. This by-pass may, as shown in Fig. 2, communicate with the heating element chamber in line with element 1, or may communicate directly by a pipe connection with element 1, as in Fig. 1.

It is necessary to have a difference in level between B and the inlet 6 for purified phlegms into the column E, and this may be taken advantage of, as shown, by the addition of concentrating section E'. This concentrating section has the advantage of raising the concentration of the alcoholic vapors delivered into the base of the rectifying column and of the boiling body of liquid therein, and, thereby, of allowing the use of richer vapors in the heating element without necessitating an intermediate condenser, as in the system disclosed in the acknowledged Patent 887,793. It also allows the extraction of fusel oils outside the rectifying column, as at 10.

The richer the alcoholic content of the boiling liquid in the base of B, the lower is the boiling point and consequently the greater is its condensing power on the vapors in B. The tubes cannot become hotter than the boiling point of the liquid. On the other hand, correlatively, with this richness increases the heating power of the phlegm vapors on the body of boiling liquid. Under atmospheric pressure, the temperature of the vapors emitted from a boiling liquid of 8° Gay-Lussac, for example, is 93.9° C. while the temperature of the vapors from liquids of 40°, 80° and 90° Gay-Lussac will be, respectively, 84.1°, 79.92° and 79.12° C.

With the extraction of fusel oil performed (as by element 10) at the base of the interposed intermediate section E', the zone of maximum concentration of the fusel oil is removed from the heater-condenser B and the rectifier C.

As to the quantity of steam or heat necessary to exhaust the wash in column E, it may be pointed out that the interposition of section E' does not affect or increase this. E' has no influence upon the liquid which enters E from 6 and passes downward so far as good exhaustion of such liquid in E is concerned. An economy is thus possible between this amount of steam and that which the rectifying column requires while obtaining the very high concentration of 96.5° to 97° Gay-Lussac in the upper plates of the latter. The economy of steam should in fact easily reach 100 kilos of steam per hectoliter of alcohol of 100° Gay-Lussac.

In Fig. 3 is shown a modified form of my invention as regards the arrangement of the heater-condenser and its connections and relations to the rectifier, as well as the connections of the latter to the column E for exhausting wash. The elements having the reference characters found in Figs. 1 and 2 are the same in function while additional elements have other reference characters.

In Fig. 3 the heater-condenser B has been somewhat modified in form to make it a comparatively long cylinder, affording a comparatively long passage for the phlegm vapors. The liquid connection of 2 with the heater instead of being at a single point is afforded through a plurality of branched connections $2^1$, $2^2$ and $2^3$, tapping at different points. Pipe 2, as in Fig. 2, delivers (arrows $g^1$, $g^2$, and $g^3$) to the purifying column D (arrow $g$) at a point just above the inlet of pipe 3, and above a plate just above said inlet.

A difference over Fig. 2 is in the connection of the vapor lead 7 from the exhausting column section E' with the rectifier C at a higher point (arrow $p$). As shown, this connection is several plates higher than B and is not immediately above B, as in Fig. 2.

Reflux 22, valved at 26 allows retrogression of liquid to column E' at its upper part (arrow $o^1$) and enables a higher concentration of vapors to be attained in E'. A complementary retrogression of liquid is effected, as before, by 8 and 9 (arrow $o$), delivering from a point at the top of the heater-condenser B to a low point in E', and in the immediate vicinity of the point where removal of fusel oil and tail products is being effected by 10. By manipulation of cock 26, the total amount of retrogressing liquid passing through 22 and 8—9 can be controlled so as to correspond to that going through 8—9 in Fig. 2.

Heat indicator, or thermometer or thalpotassimeter $21^a$, is for observing the character of the operation in E'; while 23 and 25, respectively, indicate the pressure prevailing in B and the lower part of C. Pipe 27, valved at 24, allows a direct exit (arrow $x$) for phlegm vapors when it is desired to use such vapors to heat a column or columns for final rectification, as in the invention disclosed in my copending application Ser. No. 367,697, filed April 11, 1907. In event of the abstraction of vapors for this purpose, pipe 28 may be provided for the return of condensate from the heater-condenser (arrow $y$) to the liquid-delivery pipe 3 of the present heater condenser.

In the structure of Fig. 3 of the present case, upper section E' is not, as in Fig. 2, continuous with the lower section E, but is a separate element. For convenience of illustration E, which must be on a level low enough to receive the purified phlegms coming from purifier D (here shown fragmentally) is not shown. Pipes 29 and 30 are provided for connecting (arrows $e^1$ and $e^2$) the upper or concentrating section E' with the lower section E.

What I claim is:—

1. In the distillation of alcohol, the process which comprises forming comparatively rich alcoholic vapors from comparatively weak alcohol of comparatively high boiling point, passing a current of such vapors under controlled pressure into heat-imparting relationship to stronger alcohol of lower boiling point to distil and rectify the same and separating the uncondensed from the condensed vapors of such current after so passing.

2. In the distillation of alcohol, the process which comprises forming a current of comparatively rich alcoholic vapors from comparatively weak alcohol of comparatively high boiling point, passing a controlled fraction of such current into heat-imparting relationship to stronger alcohol of lower boiling point to distil and rectify the same, separating the uncondensed from the condensed vapors of such fraction after so passing and uniting the uncondensed vapors with the residue of the said current.

3. In the distillation of alcohol, the process which comprises forming comparatively rich alcoholic vapors from comparatively weak alcohol of comparatively high boiling point, leading a current of the vapors into heat-imparting relationship to stronger alcohol of lower boiling point to distil and rectify the same, separating the condensed liquid from the uncondensed vapors of such current after such heat-imparting relationship and passing the condensed liquid and the uncondensed vapors into a column still to produce such stronger alcohol.

4. In the distillation of alcohol, the process which comprises forming comparatively rich alcoholic vapors from comparatively weak alcohol, leading a current of such vapors under controlled pressure into heat-imparting relationship to stronger alcohol to distil and rectify the same, separating the condensed liquid from the uncondensed vapors of such current after so passing and passing the condensed liquid and the uncondensed vapors into a column still to produce such stronger alcohol.

5. In the distillation of alcohol, the process which comprises forming a current of alcoholic vapors, diverting a controlled fraction of said current into heat-imparting relationship to stronger alcohol to distil and rectify the same, separating the uncondensed vapors from the condensed liquid of such fraction after this diversion, reuniting the uncondensed vapors with the residue of the original current and passing the current and the condensed liquid into a column still to produce such stronger alcohol.

6. In the distillation of alcohol, the process which comprises distilling and rectifying a body of comparatively strong alcohol by a current of weaker alcoholic vapors passed in heat-imparting relationship thereto but out of contact therewith while removing liquid from said body, forming concentrated alcoholic vapors from the removed liquid and returning the concentrated vapors to mingle with the vapors above said body.

7. In the distillation of alcohol, the process which comprises distilling and rectifying a body of comparatively strong alcohol by a current of weaker alcoholic vapors passed in heat-imparting relationship thereto but out of contact therewith, separating the condensed liquid from the uncondensed vapors of such current after so passing and passing the same into a purifying still, removing the liquid from said purifying still, removing liquid from said body, producing concentrated alcohol vapors from the removed liquids, and mingling said vapors with the vapors from the rectifying of said stronger alcohol during the rectification.

8. In the distillation of alcohol, the process which comprises distilling and rectifying a body of comparatively strong alcohol with a current of weaker alcoholic vapors passed into heating relationship thereto but out of contact therewith, transmitting the condensed and uncondensed vapors into a purifying column still, removing liquid from the purifying still and producing concentrated alcoholic vapors therefrom in a column, passing said vapors through a concentrating column at a higher level, and passing the vapors from the concentrating column into admixture with the vapors from said body, liquid from said body being also supplied to the top of said concentrating column.

In testimony whereof, I have signed my name to this specification in the presence of two subscribing witnesses.

EMILE GUILLAUME.

Witnesses:
 JULES FAYOLLET,
 DEAN B. MASON.